US012567708B2

(12) United States Patent
Ding

(10) Patent No.: US 12,567,708 B2
(45) Date of Patent: Mar. 3, 2026

(54) DATA COMMUNICATION METHOD FOR PLUG-IN DEVICE

(71) Applicant: Logitech Europe S.A., Lausanne (CH)

(72) Inventor: Rong-Hwa Ding, HsinChu (TW)

(73) Assignee: Logitech Europe S.A., Lausanne (CH)

( * ) Notice: Subject to any disclaimer, the term of this patent is extended or adjusted under 35 U.S.C. 154(b) by 372 days.

(21) Appl. No.: 18/449,477

(22) Filed: Aug. 14, 2023

(65) Prior Publication Data

US 2025/0062579 A1 Feb. 20, 2025

(51) Int. Cl.
*H01R 31/06* (2006.01)
*H01R 13/66* (2006.01)
*H01R 13/70* (2006.01)
*H01R 43/26* (2006.01)

(52) U.S. Cl.
CPC ......... *H01R 31/065* (2013.01); *H01R 13/665* (2013.01); *H01R 13/70* (2013.01); *H01R 43/26* (2013.01)

(58) Field of Classification Search
CPC .... H01R 31/065; H01R 31/665; H01R 31/70; H01R 43/26; H01R 13/70; H01R 13/665
USPC ..................................................... 439/620.21
See application file for complete search history.

(56) References Cited

U.S. PATENT DOCUMENTS 8,972,610 B2 * 3/2015 Chang .................. G06F 3/0656 709/200
10,939,521 B2 * 3/2021 Bowers .................. H05B 45/22
2007/0038785 A1 * 2/2007 Varanda ................ G06F 1/1698 710/62
2015/0254023 A1 * 9/2015 Davis .................... G06F 13/385 710/301
2015/0264773 A1 * 9/2015 Bowers .................. H05B 45/22 315/131
2016/0150275 A1 * 5/2016 Roychowdhury .......................... H04N 21/43637 725/31

FOREIGN PATENT DOCUMENTS

WO WO-2010086714 A1 * 8/2010 ............. G08C 17/02

* cited by examiner

*Primary Examiner* — Gary F Paumen
(74) *Attorney, Agent, or Firm* — Kilpatrick Townsend & Stockton LLP

(57) ABSTRACT

A system for connecting disparate communication interfaces. The system includes a dongle and an adaptor. The dongle has a first interface type of connector for connection to a first interface type of port. The adaptor provides a connection to a second interface type of port, and also includes a third interface type of port. A switch in the dongle allows connecting to the third interface type of interface port when connected to the adaptor, and connection to the first interface type of interface port when not connected to the adaptor.

20 Claims, 6 Drawing Sheets

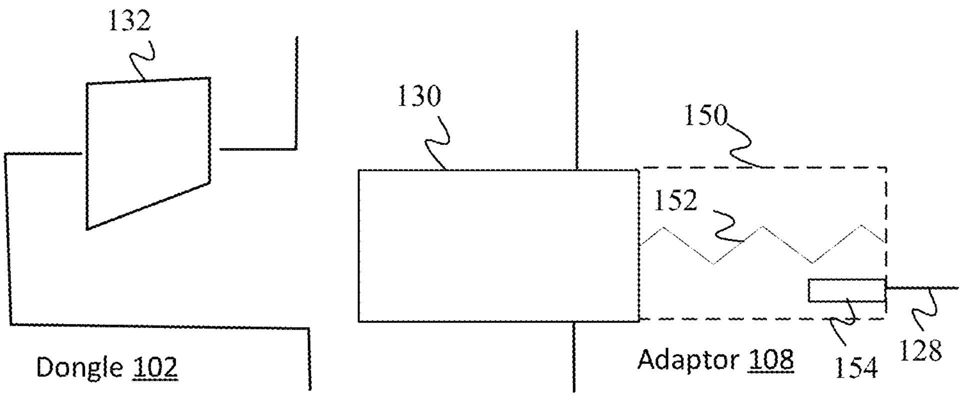
FIG. 1A
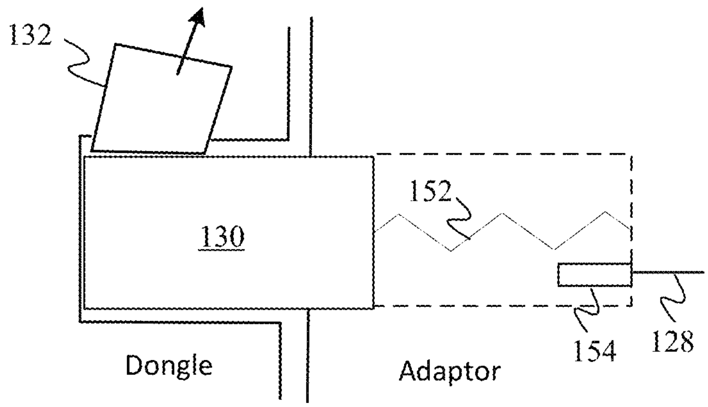
FIG. 1B
FIG. 1C
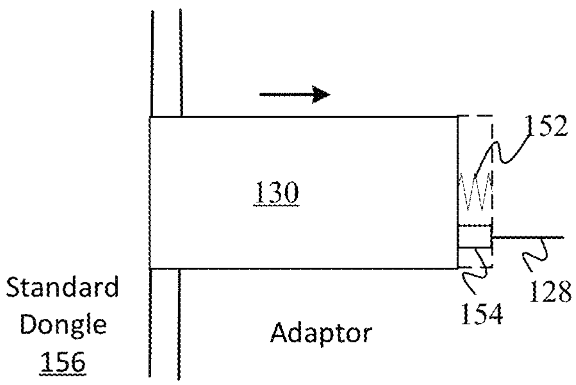

DATA COMMUNICATION METHOD FOR PLUG-IN DEVICE

BACKGROUND OF THE INVENTION

In electronic devices, there are many applications in which one device needs to be plugged into another device for operation. For example, a USB device plugged into a PC, or a dongle plugged into a base station. In most of the applications, data communication between the two devices is required. For many applications, the signal pin-out is well defined; mechanical and electronic characteristics of the connectors are clear and standardized. For example, the USB connector is standardized. However, for some specific applications, the data connection pins are not straightforward and difficult to implement. One typical example is a USB hub which is connected to a PC. It has USB connectors for a USB dongle, and can have a HDMI connector and an AUX connector for an audio connection. Inside is an expensive USB docking IC or USB hub IC.

For a USB-C audio dongle plugged into a USB-A adaptor, most applications are only used for simple connector type change from USB-C to USB-A. In such applications, many USB-C signal pins are not included in USB-A spec so these signals are simply cut, and the signal transmission is simple and straightforward. However, for additional signal input or output from the extra connector on the USB-A adaptor to the USB-C signals, the signal connection is more complicated. Signals from the USB-C connector are in the form of serial USB data, which are transmitted via D+ and D− data pins. Signals from the connectors may be in the form of analog signals or other digital formats. It is desirable to have a better method and system for making such connections.

Unless otherwise indicated herein, the materials described in this section are not prior art to the claims in this application and are not admitted to be prior art by inclusion in this section.

BRIEF SUMMARY OF THE INVENTION

Embodiments provide a system for connecting disparate communication interfaces. The system includes a dongle and an adaptor. The dongle includes a dongle connector for connecting to a port of a first interface type, a controller, an input connected to the controller for providing a signal to the controller indicating the connection of a third interface type, a conductor for connecting to the third interface type without interfering with the dongle connector connecting with only the port of the first interface type, and a memory with a non-transitory, computer readable media with instructions for combining signals of the first and third interface types. The memory may be embedded in the controller. The adaptor includes a first adaptor port of the first interface type, an adaptor connector for connecting to a port of a second interface type, an electrical connection between the first adaptor port and the adaptor connector, and a second adaptor port for receiving a connector of the third interface type, and circuitry for connecting the second adaptor port to the dongle.

In embodiments, the first interface type is USB-C, the second interface type is USB-A and the third interface type is an analog audio. In an alternate embodiment the 3$^{rd}$ interface includes a digital data bus (e.g., I2S digital audio bus, I2C digital control bus, or TX/RX bus which can be used for firmware programming), or a connector for sensors.

In embodiments, the controller includes an analog to digital converter for converting an analog signal of the third interface type into a digital signal. Alternately, the third interface may provide programming or data signals.

In embodiments, the adaptor includes a protruding member, or key, for engaging a recess in the dongle to activate a contact to indicate the connection of a connector of the third interface type. The recess is positioned separate from the dongle connector, so as to not interfere with a connection to a first interface type port. By using a recess, interference with connecting to a first interface type port, instead of the adaptor, is avoided.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

Aspects and features of the various embodiments will be more apparent by describing examples with reference to the accompanying drawings, in which:

FIGS. 1A-C are diagrams illustrating the operation of the protruding key of the adapter activating the contact of the dongle, according to embodiments.

DETAILED DESCRIPTION OF THE INVENTION

While certain embodiments are described, these embodiments are presented by way of example only, and are not intended to limit the scope of protection. The apparatuses and systems described herein may be embodied in a variety of other forms. Furthermore, various omissions, substitutions, and changes in the form of the example methods and systems described herein may be made without departing from the scope of protection.

This invention is related to a method for data transmission between the two devices, with one device (e.g., a dongle) plugged into the other device (e.g., an adaptor). An embodiment can be explained with the example of a USB-C dongle plugged into a USB-A adaptor. There are 24 signal pins inside a USB-C connector; but only 4 pins for a FS/HS USB-A connector and 9 pins for super speed USB-A connector. Therefore, many pins are unused in the USB-C connector when inside a standard USB-A adaptor. These unused pins will be utilized in the method described in this patent application.

Figure 1:
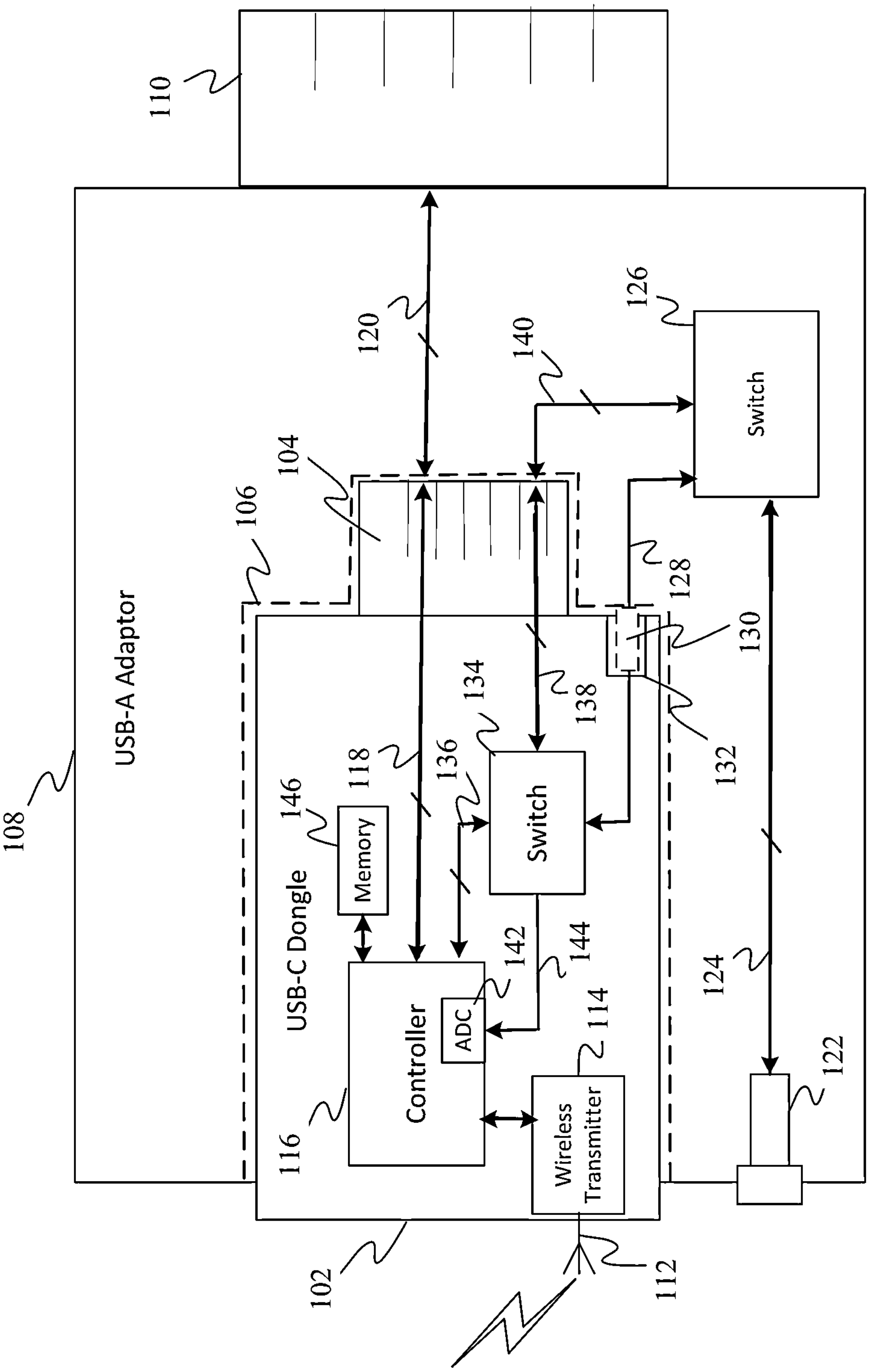
FIG. 1 is a diagram of a combination of a dongle and adaptor for connecting three interface types, according to a first embodiment with a recessed third interface detector on the dongle.

FIG. 1 is a diagram of a combination of a dongle and adaptor for connecting three interface types, according to a first embodiment with a recessed third interface detector on the dongle. A protruding key 130 from the USB-A adaptor 108 is provided. When the USB-C dongle is plugged into the USB-A adaptor, this key pushes a detector 132 inside a cavity on the USB-C dongle device. A selector (e.g., switch 134) inside the USB-C dongle can switch and connect the unused USB-C signals on the connector to designated controller pins (e.g., an ADC for analog signals conversion). The signals from the additional connector on USB-A adaptor are turned on by switch 134 inside the USB-A adaptor for this connection. This switch is optional because for this special type of USB-A adaptor, these unused pins in the USB-C connector can always be used for such a connection in one embodiment. When the USB-C dongle is plugged into a normal USB-C female connector, since there is no such protruding key, and the selector (switch 134) keeps the original USB-C signal pins connected to the connector.

In this method, unused pins in the original connector are used for the additional connector signal connection. No additional IC nor additional signal metal contacts are required, which largely saves the cost and design complexity. This method can be applied to other general plug-in device applications; it is not limited by the USB-C dongle to USB-A adaptor example.

FIG. 1 shows a dongle 102 (e.g., a USB-C dongle) that includes a dongle connector 104 for connecting to a port 106 of a first interface type (e.g., a USB-C interface). Port 106 is part of an adaptor 108 with a connector 110 for connecting to a second interface type (e.g., USB-A). Dongle 102 receives wireless data via an antenna 112 connected to a wireless transceiver 114. The data is provided to a controller 116, which formats and sends the data on conductors 118 through connector 104 to conductors 120 of adaptor 108. The data is then provided to connector 110. Data can flow in the reverse direction as well, from connector 110 to antenna 112. In one embodiment, where the dongle is a USB-C dongle and the adapter is a USB-A adaptor, the USB-C dongle has more conductors in connector 104 than there are connectors in connector 110 of adaptor 108. Thus, only a portion of the conductors of connector 104 are connected to conductors 118.

A port 122 allows connection of a connector of a third interface type (e.g. an analog audio input or additional control or data input, such as an RS-232 connector). When such a connection is made, a signal propagates along lines 124 to a switch 126. The connection of the dongle to the adaptor is communicated to the dongle via a key 130 which extends into a recessed contact 132, and activates a mechanical switch which provides a connection signal to a dongle switch 134. Alternately, key 130 can have an electrical contact at its end connected to a conductor line 128. Switch 126 provides a control signal on line 128 indicating that an input is present on port 122. This control signal is then directed to dongle switch 134, without the need for a mechanical switch. In one example, the "jack detection" pin in the audio aux connector provides a signal on port 122 that is detected by switch 126. It can signal the presence of the aux jack plugged in (by a voltage high active or low active signal).

Switch 126 also provides the data from port 122 on lines 140 to the lines of connector 104 that are not used for the USB-A port. These lines are connected to lines 138 internal to dongle 102. Internal dongle switch 134 then provides the data on lines 144 to controller 116. When the input is analog, the analog data is provided to an Analog-to-Digital Converter (ADC) 142 in controller 106. Alternatively, the ADC could be external to the controller.

When dongle 102 is plugged into a normal USB-C port, there will be no adaptor port 122 and no protruding key 130 to trigger contact 132, and thus no signal to dongle switch 134. As a result, switch 134 will couple the data on lines 138 to internal lines 136 connected to the normal USB-C input/outputs of controller 116. Thus, lines 136 plus lines 118 form all the normal USB-C connector lines. Because contact 132 is recessed, it will not interfere with the connection of dongle 102 to a standard, normal USB-C port. A program for controlling controller 116, along with wireless transmitter 114 and switch 134, is stored in a memory 146. Memory 146 includes a non-transitory, computer readable media with instructions for controlling the connections and signal conversions described herein.

In one embodiment, the controller is a wireless audio IC (for example, a Bluetooth audio controller). The analog audio signal from 122 to 124 to 140 to 138 to 142 is converted into digital audio data, and then it's mixed with the Bluetooth digital audio data before transmitting to a wireless headset for playback.

FIGS. 1A-C are diagrams illustrating the operation of the protruding key of the adapter activating the contact of the dongle, according to embodiments. In one example, as shown in FIG. 1A, the protruding key 130 is a pogo pin with spring 152 in the adaptor 108. The contact 132 is a depressible switch, in particular a swingable contact detector in the dongle 102.

FIG. 1B illustrates when the dongle 102 is plugged in to the adaptor 108. The swingable contact detector 130 is pressed upward, and its switch is triggered so the switch 134 in the USB-C dongle connects the signal 138 to ADC 142. At the same time, a switch 154 is not compressed. Thus, there is no trigger to switch the signal on line 124 in adaptor 108. Thus, external signal 124 is routed to the interface pins 140 for connection to signal 138.

FIG. 1C illustrates what happens when a standard dongle 156 from other vendors is plugged in to the adaptor 108. There is no concave recess in the corresponding location of the dongle, so the pogo pin 130 of the adaptor is pushed inward, compressing spring 152 and compressing switch 154 to activate a signal on line 128. As a result, signals 140 is cut because they are unused pins for a USB-A interface.

In an alternate embodiment, the recessed contact 130 and protruding key 132 are swapped between the dongle and the adaptor. In this embodiment, the protruding key is part of dongle 102, and the recessed contact is part of adaptor 108. While a particular switch design with a protruding key and recess are shown, variations are possible. For example, a push button switch like switch 154 could be used at the end of the recess, instead of a swingable switch on the side. Also, a swingable switch could be used instead of the depressible button switch 154 in adaptor 108.

Figure 2:
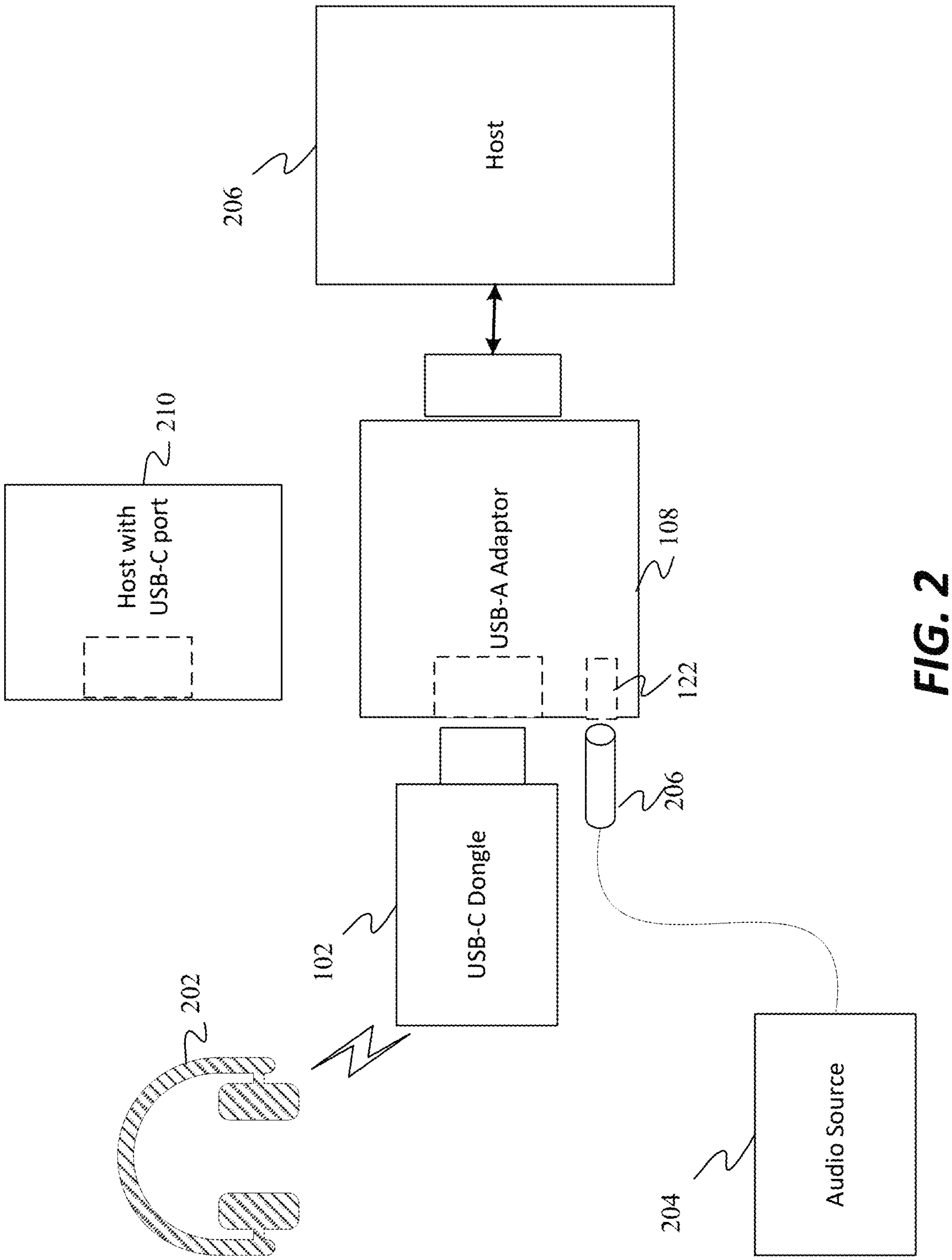
FIG. 2 is a diagram of an example system using the dongle and adaptor combination of FIG. 1, according to embodiments.

FIG. 2 is a diagram of an example system using the dongle and adaptor combination of FIG. 1, according to embodiments. Headphones 202 are wirelessly coupled to dongle 102, which connects to adaptor 108. An audio source 204 has a connector 206 which connects to port 122 of adaptor 108. Adaptor 108 is connected to a host 206. In one example, a video game or other video or audio program is playing on host 206 with audio provided to headphones 202 through adaptor 108 and dongle 102. Audio from audio source 204 is superimposed on the audio from host 206.

In one embodiment, the audio source is the audio output from a game machine aux port, e.g., the Nintendo Switch. In this example, the user can keep the host 206 audio connected while hearing the game play through the aux. Another example is the analog audio output from a TV during game playing. The host 206 is the game console (for example, PS5) connected to the TV, which provides the game chatting audio through the USB port and the game background audio signal to the TV. These two signals can be mixed together in the dongle for the game player. The game console PS and XBOX produce two audio signals, a game audio and a game chat, during the game. In contrast, the SONY PS5 allows only game chat audio data to be connected to the USB audio for non-SONY headsets.

A second host 210 is shown, with a standard USB-C port. Dongle 102 could be plugged into this host without contact 132 of FIG. 1 interfering. In this configuration, switch 134 of dongle 102 connects lines 134 of the dongle connector 104 to lines 136 of FIG. 1. Lines 136 and line 118 together provide all the USB-C contacts of connector 104 to controller 116.

FIG. 2 is just one example of a third interface type. In another example, port 122 could receive control signals or program update downloads for dongle 102 or adaptor 108.

No Switch Alternate Embodiment

Figure 3:
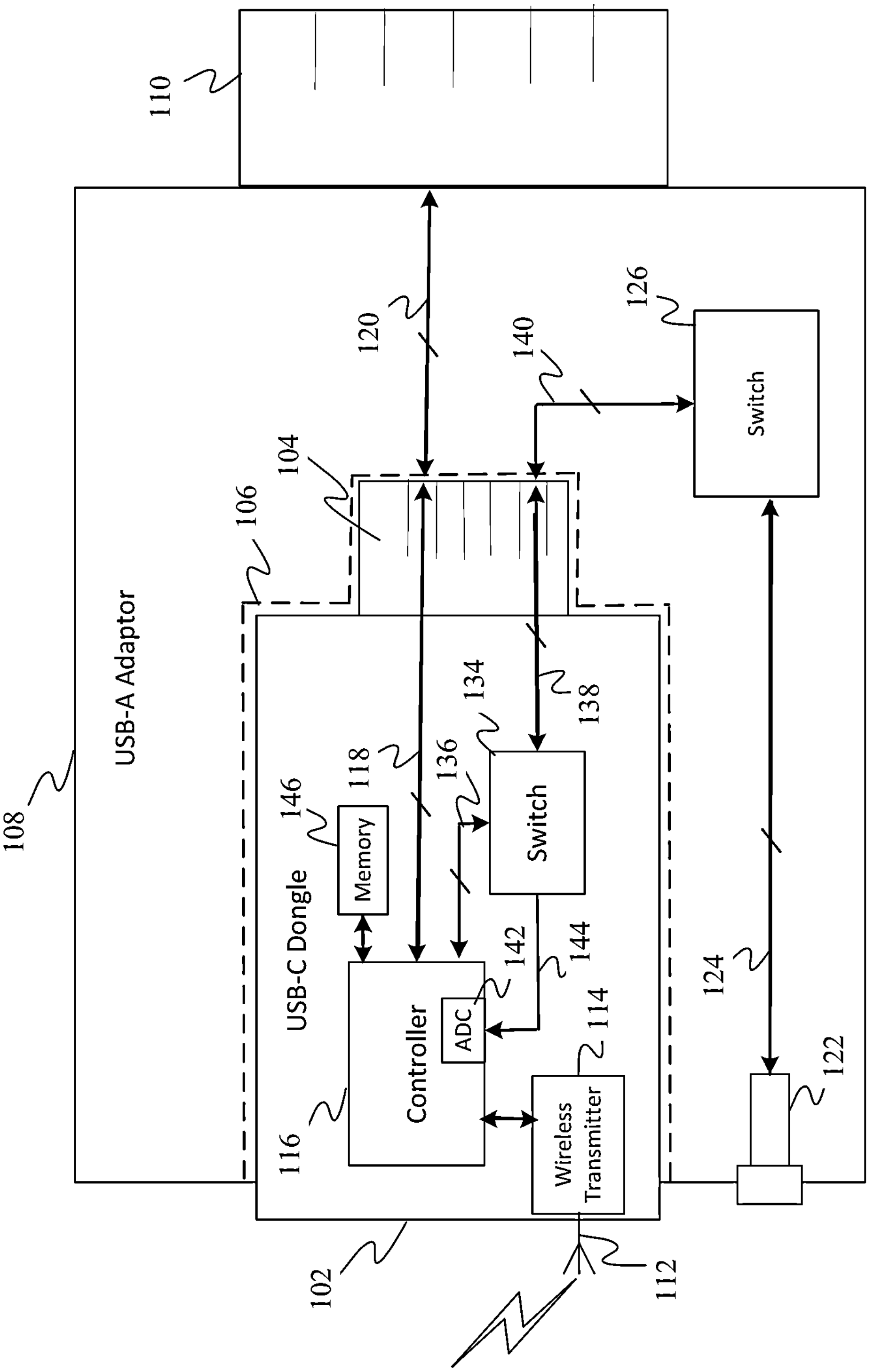
FIG. 3 is a diagram of a combination of a dongle and adaptor for connecting three interface types, according to a first embodiment without modification of the dongle contacts.

FIG. 3 is a diagram of a combination of a dongle and adaptor for connecting three interface types, according to a second embodiment without modification of the dongle contacts. No key is used as in the embodiment of FIG. 1. Instead, switch 126 sends a connection signal along one of lines 140 when a connector is connected to port 122. The connection signal could simply be a connection to ground or a pull-up to the power supply, or a slight voltage drop of one of the multiple power pins in a USB-C connector. The signals from port 122 are then provided on one or more other lines of lines 140. Alternately, switch 126 could be eliminated and port 122 could be directly connected to lines 140. Dongle switch 134 would have circuitry for detecting that the signals on lines 140 come from a third interface type, and switch the incoming signals accordingly. For analog signals, they would be switched to ADC 142. For control signals, they would be switched to a control input of controller 116. If no third interface is detected, it is assumed that the dongle is connected to a regular USB-C port, and switch 134 routes lines 140 to controller 116 as part of the USB-C connector lines 118.

Exterior Contact Alternate Embodiment

Figure 4:
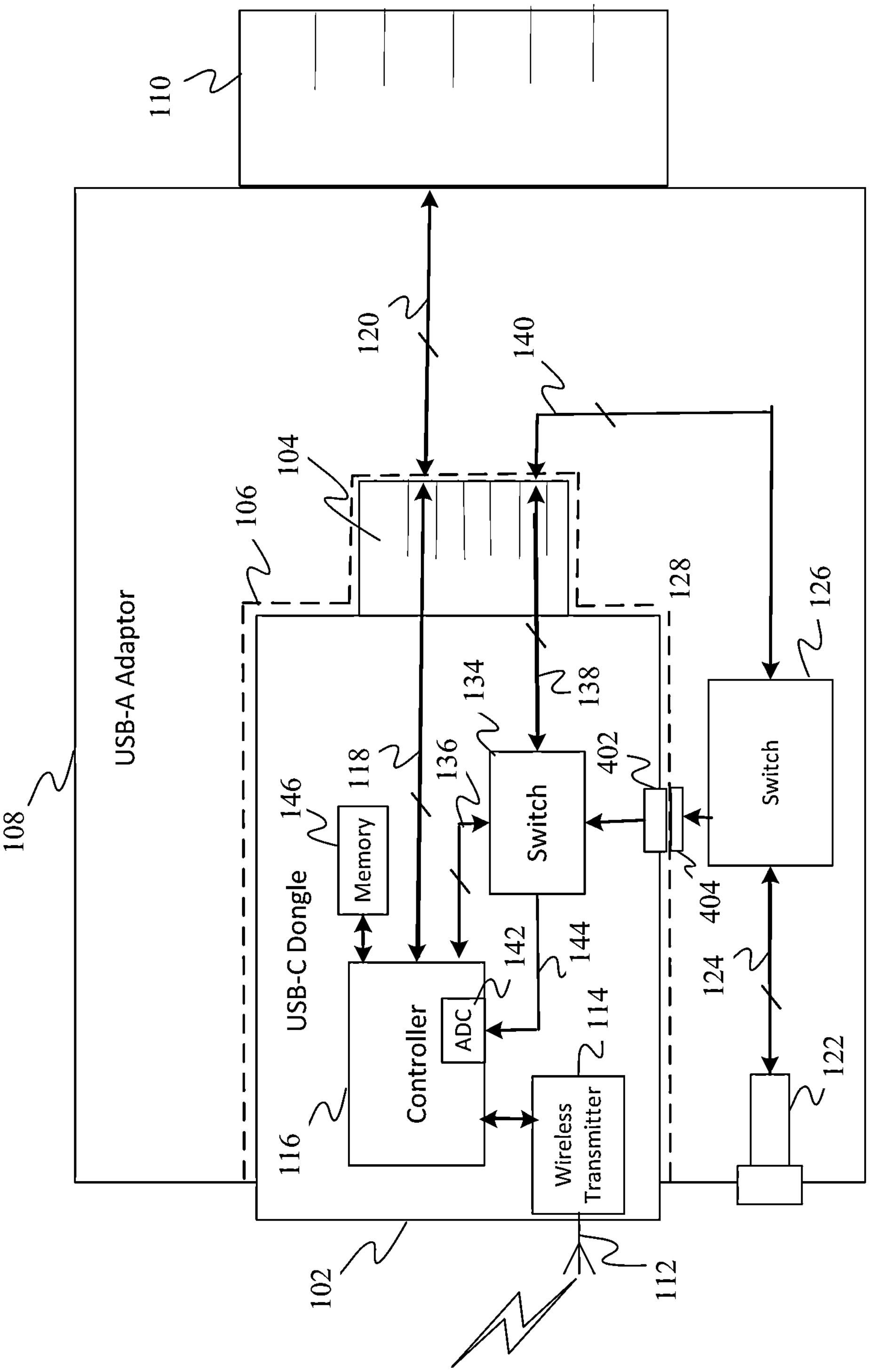
FIG. 4 is a diagram of a combination of a dongle and adaptor for connecting three interface types, according to a first embodiment with a surface contact on the dongle.

FIG. 4 is a diagram of a combination of a dongle and adaptor for connecting three interface types, according to a third embodiment with a surface contact on the dongle. Instead of the key and recess of FIG. 1, a pair of surface contacts 402 and 404 are used. Switch 126 provides a signal to contact 404 when a connector is plugged into port 122.

As in FIG. 1, port 122 allows connection of a connector of a third interface type (e.g. and analog audio input or additional control or data input, such as an RS-232 connector). When such a connection is made, a signal propagates along lines 124 to a switch 126. The connection of the dongle to the adaptor is communicated to the dongle via contact 404 on adaptor 108 and contact 402 on dongle 102, which come into contact with each other when dongle 102 is inserted into port 106 of adaptor 108. Switch 126 provides a control signal through contacts 404, 402 indicating that an input is present on port 122. This control signal is then directed to dongle switch 134.

Switch 126 also provides the data from port 122 on lines 140 to the lines of connector 104 that are not used for the USB-A port. These lines are connected to lines 138 internal to dongle 102. Internal dongle switch 134 then provides the data on lines 144 to controller 116. When the input is analog, the analog data is provided to an Analog-to-Digital Converter (ADC) 142 in controller 106.

As in the embodiments of FIGS. 1 and 3, when dongle 102 is plugged into a normal USB-C port, there will be no adaptor port 122, and thus no signal to dongle switch 134. As a result, switch 134 will couple the data on lines 138 to internal lines 136 connected to the normal USB-C input/outputs of controller 116. Thus, lines 136 plus lines 118 form all the normal USB-C connector lines. Because contact 402 is a surface contact that does not change the shape of dongle 102, and because it is on the side, it will not interfere with the connection of dongle 102 to a standard, normal USB-C port.

There is some risk that contact 402 may be mistakenly activated when the USB-C dongle is used without the adaptor to connect to a standard USB-C port. For example, the user's hand with static electricity may touch the contacts, which could damage the IC pins, or trigger these pins mistakenly. Optionally, a mechanical protection mechanism could be added, or alternatively protection circuitry could be added inside the dongle to protect against static electricity. In one embodiment, a sliding mechanical cover can be used. For example, contact 402 could be recessed with a mechanical cover flush with the side of dongle 102. Contact 404 could be spring loaded, so that it pushes the mechanical cover to the side when the dongle is inserted, and the spring biases contact 404 against contact 402.

Figure 5:
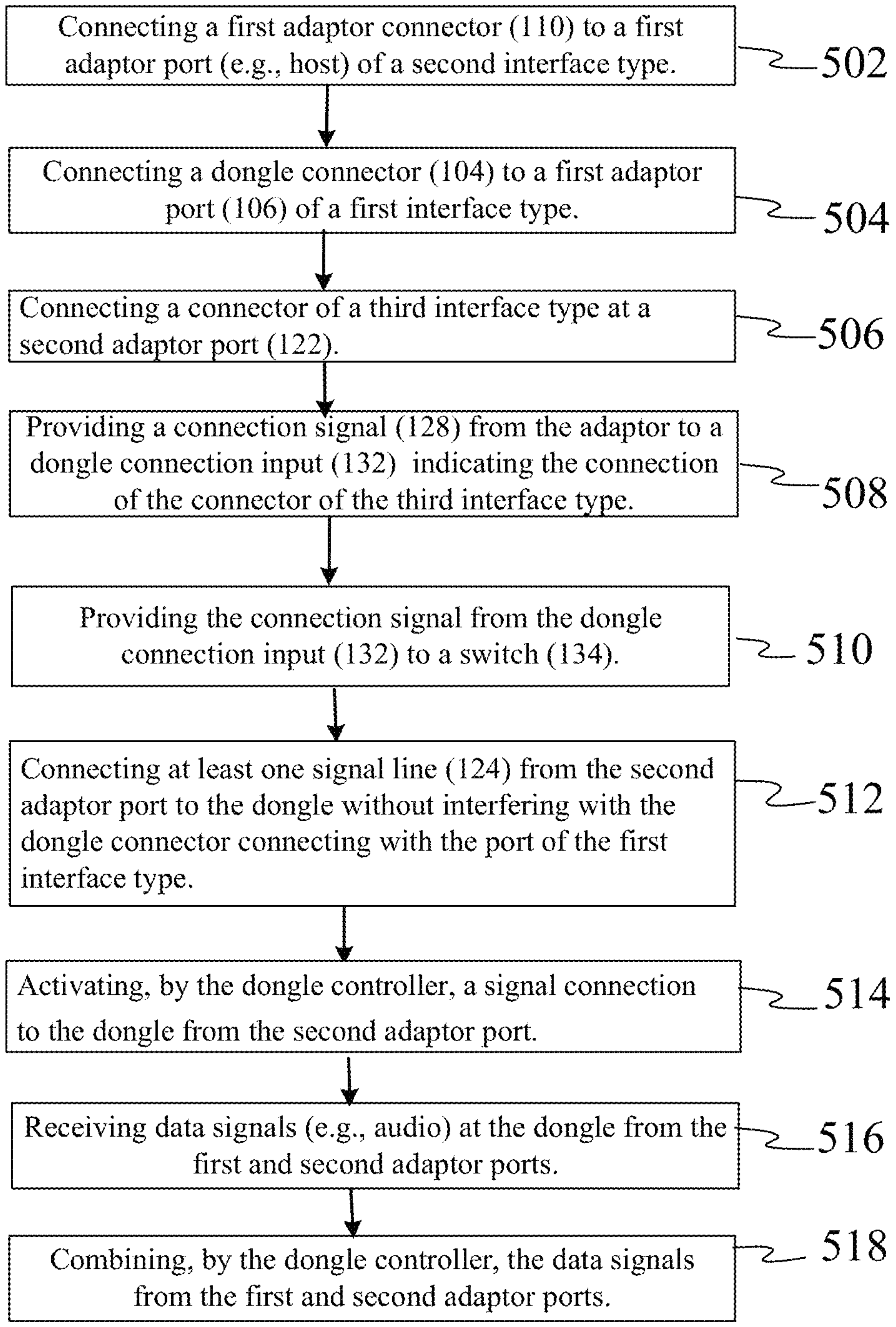
FIG. 5 is a flowchart of a method for switching the adaptor inputs of a dongle and adaptor combination, according to embodiments.

FIG. 5 is a flowchart of a method for switching the adaptor inputs of a dongle and adaptor combination, according to embodiments. Step 502 is connecting a first adaptor connector (110) to a first adaptor port (e.g., host 206) of a second interface type. Step 504 is connecting a dongle connector (104) to a first adaptor port (106) of a first interface type. Step 506 is connecting a connector of a third interface type at a second adaptor port (122). Step 508 is providing a connection signal (128) from the adaptor to a dongle connection input (132) indicating the connection of the connector of the third interface type. Step 510 is providing the connection signal from the dongle connection input (132) to a switch (134). Step 512 is connecting at least one signal line (124) from the second adaptor port to the dongle without interfering with the dongle connector connecting with the port of the first interface type. Step 514 is activating, by the dongle controller, a signal connection to the dongle from the second adaptor port. Step 516 is receiving data signals (e.g., audio) at the dongle from the first and second adaptor ports. Step 518 is combining, by the dongle controller, the data signals from the first and second adaptor ports.

In one embodiment, the data signals from the second adaptor port are audio signals from an audio source (e.g., a user's microphone). This audio is combined with audio from a host (e.g., a video game playing on the host). The combined signal can be sent back to the host, and or to a device connected to the dongle (wirelessly or wired). In one example, the device is a headset wirelessly connected to the dongle.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, the term "dongle" used herein can refer to any device, part or apparatus that includes the connectors and signal processing described herein for a dongle. Similarly, the term "adaptor" used herein can refer to any device, part or apparatus that includes the connectors and signal processing described herein for an adaptor.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all the features and advantages set forth herein, are also within the scope of this disclosure. Accordingly, the scope of the present disclosure is intended to be defined only by reference to the appended claims.

The system or systems discussed herein are not limited to any particular product, hardware architecture or configuration. Embodiments of the methods disclosed herein may be performed in the operation of such computing devices. The order of the steps presented in the examples above can be varied—for example, steps can be re-ordered, combined, and/or broken into sub-steps. Certain steps or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process steps may be omitted in some embodiments. The methods and processes described herein are also not limited to any particular sequence, and the steps or states relating thereto can be performed in other sequences that are appropriate. For example, described steps or states may be performed in an order other than that specifically disclosed, or multiple steps or states may be combined in a single step or state. The example steps or states may be performed in serial, in parallel, or in some other manner. Steps or states may be added to or removed from the disclosed examples. Similarly, the example systems and components described herein may be configured differently than described. For example, elements may be added to, removed from, or rearranged compared to the disclosed examples.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A system for connecting disparate communication interfaces, comprising:
- a dongle including:
  - a dongle connector for connecting to a port of a first interface type;
  - a controller;
  - an input connected to the dongle for providing a signal to the dongle indicating the connection of a third interface type;
  - a conductor for connecting to the third interface type without interfering with the dongle connector connecting with the port of the first interface type;

a memory with a non-transitory, computer readable media with instructions for combining signals of the first and third interface types; and an adaptor including:

a first adaptor port of the first interface type;

an adaptor connector for connecting to a port of a second interface type;

an electrical connection between the first adaptor port and the adaptor connector; and a second adaptor port for receiving a connector of the third interface type, and circuitry for connecting the second adaptor port to the dongle.

2. The system of claim 1 wherein the first interface type is USB-C, the second interface type is USB-A and the third interface type is an analog audio.

3. The system of claim 1 wherein the conductor for connecting to the third interface type is at least one conductor of the dongle connector for connecting to a port of the first interface type.

4. The system of claim 1 wherein the controller includes an analog to digital converter for converting an analog signal of the third interface type into a digital signal.

5. The system of claim 1 wherein the dongle further includes a switch for switching at least one conductor of the dongle connector to an analog to digital converter input of the controller and a recessed contact, positioned separate from the dongle connector, connected to a control input of the switch.

6. The system of claim 1 wherein the dongle further includes a switch for switching at least one conductor of the dongle connector between a connection to the controller for signals of the second interface type and signals to the controller of the third interface type.

7. The system of claim 1 wherein the input of the dongle is a recessed contact, and further comprising a protruding member of the adaptor positioned to engage the recessed contact.

8. The system of claim 1 wherein the input of the dongle is a protruding member, and further comprising a recessed contact of the adaptor positioned to engage the protruding member of the dongle.

9. A system for connecting disparate communication interfaces, comprising:

a dongle including:

a dongle connector for connecting to a USB-C port;

a controller;

an input connected to the dongle for providing a signal to the dongle indicating the connection of an analog interface;

an analog to digital converter for converting an analog signal of the analog interface into a digital signal;

a conductor for connecting to the analog interface without interfering with the dongle connector connecting with the USB-C port;

a switch for switching at least one conductor of the dongle connector to an analog to digital converter input of the controller;

a recessed contact, positioned separate from the dongle connector, connected to a control input of the switch;

a memory with a non-transitory, computer readable media with instructions for combining signals of the USB-C port and the analog interface; and an adaptor including:

a first adaptor port of a USB-C interface;

an adaptor connector for connecting to a USB-A port;

an electrical connection between the first adaptor port and the adaptor connector; and an analog adaptor port for receiving an analog connector, and circuitry for connecting the analog adaptor port to the dongle; and a protruding member positioned to engage the recessed contact of the dongle.

10. The system of claim 9 wherein the recessed contact comprises a swingable switch positioned along a side of a recess, and the protruding member comprises a pogo pin mounted on a spring.

11. The system of claim 10 further comprising an adaptor switch adjacent the spring, the adaptor switch being connected to a line connected to control isolation of the circuitry for connecting the analog adaptor port to the dongle.

12. A method for connecting disparate communication interfaces, comprising:

connecting a first adaptor connector of an adaptor to a host port of a second interface type;

connecting a dongle connector of a dongle to a first adaptor port of a first interface type;

connecting a connector of a third interface type at a second adaptor port;

providing a connection signal from the adaptor to a dongle connection input indicating the connection of the connector of the third interface type;

providing the connection signal from the dongle connection input to a dongle controller;

connecting at least one signal line from the second adaptor port to the dongle without interfering with the dongle connector connecting with the first adaptor port of the first interface type;

activating a signal connection to the dongle from the second adaptor port;

receiving data signals at the dongle from the first and second adaptor ports; and combining, by the dongle controller, the data signals from the first and second adaptor ports.

13. The method of claim 12 wherein the first interface type is USB-C, the second interface type is USB-A and the third interface type is an analog audio.

14. The method of claim 12 wherein the step of connecting at least one signal line from the second adaptor port to the dongle comprises connecting to at least one conductor of the dongle connector.

15. The method of claim 12 further comprising, converting, with the dongle controller, an analog signal of the third interface type into a digital signal.

16. The method of claim 12 further comprising:

switching, with a dongle switch, at least one conductor of the dongle connector to an analog to digital converter input of the dongle controller.

17. The method of claim 16 further comprising:

providing a control input to the dongle switch from the connection signal received at a recessed contact positioned separate from the dongle connector.

18. The method of claim 16 further comprising:

switching, with the dongle switch, at least one conductor of the dongle connector between a connection to the dongle controller for signals of the second interface type and a connection to the dongle controller for signals of the third interface type.

19. The method of claim 12 wherein the step of providing a connection signal from the adaptor to a dongle connection input indicating the connection of the connector of the third interface type comprises:

engaging a recessed contact of the dongle with a protruding member of the adaptor positioned to engage the recessed contact.

20. The method of claim 12 wherein the step of providing a connection signal from the adaptor to a dongle connection input indicating the connection of the connector of the third interface type comprises:

engaging a recessed contact of the adaptor with a protruding member of the dongle positioned to engage the recessed contact.

* * * * *